United States Patent
Iwashita et al.

(10) Patent No.: US 7,531,981 B2
(45) Date of Patent: May 12, 2009

(54) CONTROLLER FOR SERVOMOTOR

(75) Inventors: Yasusuke Iwashita, Fujiyoshida (JP); Tadashi Okita, Fujiyoshida (JP); Hiroyuki Kawamura, Yamanashi (JP); Kenichi Takayama, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 119 days.

(21) Appl. No.: 11/703,797

(22) Filed: Feb. 8, 2007

(65) Prior Publication Data
US 2007/0188123 A1  Aug. 16, 2007

(30) Foreign Application Priority Data
Feb. 16, 2006  (JP) .............................. 2006-039276

(51) Int. Cl.
*G05B 11/32* (2006.01)
(52) U.S. Cl. ........................ 318/625; 318/560; 318/567; 318/569
(58) Field of Classification Search ................. 318/560, 318/625, 630, 567, 569
See application file for complete search history.

(56) References Cited

U.S. PATENT DOCUMENTS 5,418,440 A * 5/1995 Sakaguchi et al. .......... 318/560
5,598,077 A * 1/1997 Matsubara et al. ..... 318/568.22
5,691,616 A * 11/1997 Iwashita ...................... 318/615

(Continued)

FOREIGN PATENT DOCUMENTS
CN  1322311  11/2001

(Continued)

OTHER PUBLICATIONS

Chinese Patent Office Action, mailed May 9, 2008 and issued in corresponding Chinese Patent Application No. 2007100788024.

(Continued)

*Primary Examiner*—Bentsu Ro
*Assistant Examiner*—David S Luo
(74) *Attorney, Agent, or Firm*—Staas & Halsey LLP

(57) ABSTRACT

A controller for a servomotor capable of improving accuracy of positioning and quality of a machined surface by switching modes of correction of a position command or the like, and reducing a shock at the time of switching. A correction amount generating section obtains a correction amount based on a value of a correction factor such as machine temperature. When the external signal is in ON state, a position command or the like is corrected by the correction amount obtained by the correction amount generating section and sent via switches. A correction amount holding section holds the correction amount obtained by the correction amount generating section. When the external signal turns to OFF state, the connection of the switches is changed so that correction is performed by the correction amount held in the correction amount holding section. When the connection of the switches is changed, the correction amount does not change rapidly, so that the machine does not suffer a shock. In positioning, the external signal is turns to ON state, so that the positioning is carried out accurately by performing correction by the correction amount sent from the correction amount generating section. When a high-quality machined surface is required, the external signal is turned to OFF state so that the correction amount does not change to achieve improvement in the quality of a machined surface.

8 Claims, 3 Drawing Sheets

U.S. PATENT DOCUMENTS

| | | | |
|---|---|---|---|
| 6,274,994 B2 * | 8/2001 | Tsutsui | 318/560 |
| 6,744,233 B1 * | 6/2004 | Tsutsui | 318/560 |
| 6,889,115 B2 | 5/2005 | Shiba et al. | |
| 2004/0180606 A1 | 9/2004 | Iwashita et al. | |
| 2006/0113946 A1 | 6/2006 | Okita et al. | |

FOREIGN PATENT DOCUMENTS

| | | |
|---|---|---|
| JP | 2-93706 | 4/1990 |
| JP | 4-261751 | 9/1992 |
| JP | 6-190686 | 7/1994 |
| JP | 11-114775 | 4/1999 |
| JP | 2002-297241 | 10/2002 |
| JP | 2003-39278 | 2/2003 |
| JP | 2004-288164 | 10/2004 |
| JP | 2005-46944 | 2/2005 |
| JP | 2006-158026 | 6/2006 |

OTHER PUBLICATIONS

Japanese Patent Office Action, mailed Dec. 25, 2007 and issued in corresponding Japanese Patent Application No. 2006-039276.

Office Action mailed on Apr. 30, 2008 and issued in corresponding Japanese Patent Application No. 2006-039276.

* cited by examiner

CONTROLLER FOR SERVOMOTOR

BACKGROUND OF THE INVENTION

1. Field of the Invention

The present invention relates to a controller for controlling a servomotor for use as a driving source of a movable part of a machine such as a machine tool, so as to control position and/or velocity of the movable part of the machine.

2. Description of Related Art

In machine tools, a servomotor is used as a driving source for a feed axis which moves a movable part such as a tool or a table with a workpiece mounted on, where by driving the feed axis by controlling the position and velocity of the servomotor, the workpiece is machined into a shape designated by a machining program or the like.

Regarding the controlling of such servomotor, there is known a method in which a position command or a velocity command is corrected so that a workpiece can be machined into a designated shape with high accuracy. When the machine continues to be used, the machine is heated by heat produced from the motor, etc. and undergoes thermal deformation. The servomotor drives a movable part via a feed mechanism or the like such as a ball screw/nut mechanism. Thus, if the feed mechanism undergoes thermal displacement, even when the servomotor is driven correctly according to the machining program, the intended shape cannot be achieved due to this thermal displacement, or in other words, the machining accuracy lowers. There is known a method intended to prevent this, in which, by detecting a machine temperature or the like by a temperature sensor or the like and correcting a position command, a position deviation, a velocity command or the like based on the temperature detected, machining is performed with high accuracy.

In a synchronous control method in which one object is driven by two synchronized servomotors, stress is produced in each motor due to thermal expansion of the machine or the like. There is known an invention intended to reduce such stress, in which, by obtaining a position-deviation correction amount based on a current command (torque command) outputted to each servomotor or an actual current supplied to each servomotor, a position deviation, namely a difference between a position designated by a command and a position feedback amount is corrected (see JP 2004-288164A).

Some of the inventors of this application developed a controller intended to suppress oscillation of a driven object, in which by providing an acceleration sensor for detecting the acceleration of a driven object and correcting a position command, a position deviation, a velocity command or the like based on the acceleration detected by the acceleration sensor, the oscillation of the driven object is suppressed, and Japanese Patent Application No. 2004-341770 was filed and published as JP 2006-158026A.

In the machine tool, when the correction amount used for correcting a position command, position deviation or velocity command varies during machining, such variation leads to fluctuation of the position of the servomotor, and causes lowering of the surface quality of a machined piece. Further, if correction to a position command, position deviation or velocity command is not carried out, the position of an object becomes different from the position designated by a command due to thermal displacement or the like as mentioned above, which results in a greater positioning error.

Further, when one object is driven by more than one servomotors as mentioned above, if correction to a position command, velocity command or the like is not carried out, stress is produced in each servomotor, or in other words, force exerted on each servomotor increases.

SUMMARY OF THE INVENTION

The present invention provides a controller capable of selectively switching performing/non-performing of correction to a position command, position deviation or velocity command in accordance with conditions and occasions. The invention also provides a controller capable of reducing a shock caused by variation of the position command or velocity command depending on whether the correction amount is null or not at the time the correction starts or ends.

A controller of the present invention controls a servomotor for driving a controlled object using a position command, a position deviation and a velocity command. According to an aspect of the present invention, the controller comprises: detecting means for detecting a magnitude of a fluctuation factor of the controlled object; correction means for determining a correction amount for correcting one of the position command, the position deviation and the velocity command based on the magnitude of the fluctuation factor detected by the detecting means during the control of the servomotor, and performing the correction by the correction amount; and switching means for selectively switching performing/non-performing of the correction by the correction means according to an external signal. With this arrangement, the switching can be made between performing the correcting of one of the position command, the position deviation and the velocity command in view of accurate and quick positioning, and not performing of the correction in view of quality of a machined surface so that the position command, the position deviation or the velocity command is not varied.

According to another aspect of the present invention, the controller comprises: detecting means for detecting a magnitude of a fluctuation factor of the controlled object; correcting means for correcting one of the position command, the position deviation and the velocity command by a correction amount; determining means for determining and updating the correction amount based on the magnitude of the fluctuation factor detected by the detecting means during the control of the servomotor; and switching means for selectively suspending/resuming the updating of the correction amount by the determining means according to an external signal. With this arrangement, the switching can be made between performing the correcting of one of the position command, the position deviation and the velocity command by the correction amount updated in accordance with the fluctuation factor in view of accurate and quick positioning, and suspending the updating of the correction amount to perform the correction with the fixed correction amount in view of quality of a machined surface, so that a sharp change of the correction amount is prevented in the switching not to impart a shock to the machine.

The determining means may comprise a correction amount holding section for holding a value of the correction amount immediately before the updating of the correction amount is suspended, and the correcting means may perform the correction using the value of the correction amount held by the correction amount holding section while the updating of the correction amount is suspended.

The determining means may determine the correction amount to be continuously changed using the value of the correction amount held by the correction amount holding section, when the updating of the correction amount is resumed.

The determining means may comprise a correction amount generating section including a filter, and the value of the correction amount held by the correction amount holding section may be used as an initial output value of the filter so that the correction amount continuously changes when the updating of the correction amount is resumed.

The controller may be adapted to control a plurality of servomotors in synchronism. In this case, the detecting means may includes monitoring means for monitoring torques of the servomotors, and the determining means may determines the correction amount based on a difference between the monitored torques.

The controller may be adapted to control two servomotors in synchronism. In this case, the monitoring means may monitor current commands for the two servomotors, and the determining means may determine the correction amount based on a difference between the monitored current commands.

Since the switching between performing and non-performing of correction of the position command, the position deviation or the velocity command by the correction amount determined based on the fluctuation factor of the controlled object, or the switching between correction by the updated correction amount and correction by the fixed correction amount is made in accordance with an external signal, the control for carrying out accurate and quick positioning and the control of preventing lowering of quality of a machined surface possibly caused by variation of the correction amount is selected in accordance with conditions and occasions.

DETAILED DESCRIPTION

Figure 1:
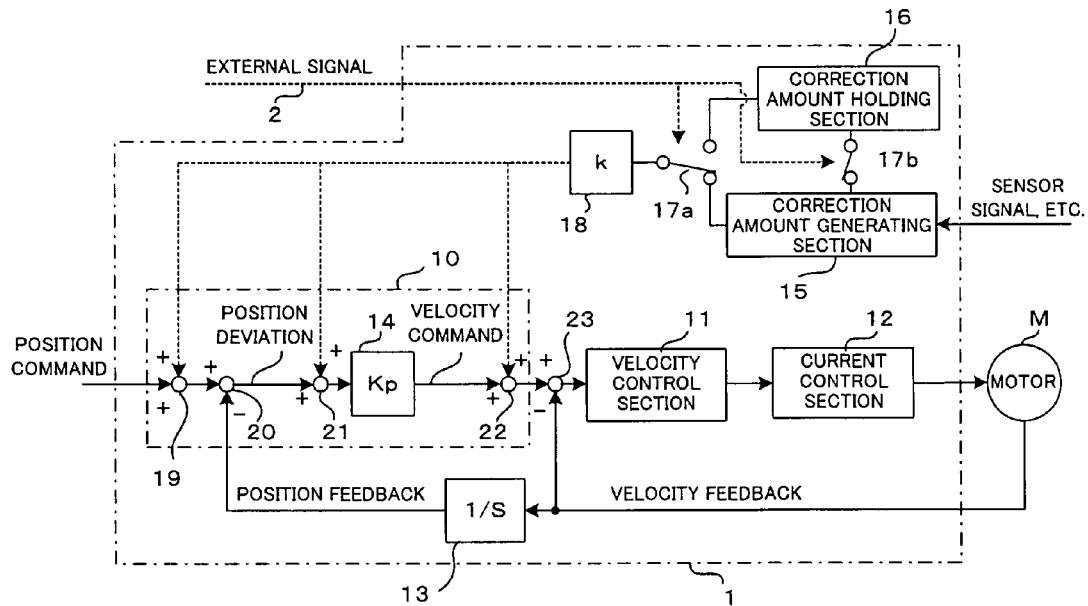
FIG. 1 is a schematic block diagram showing a first embodiment of the present invention.

FIG. 1 is a schematic block diagram showing a first embodiment of the present invention.

Like the prior servomotor controllers, a servomotor controller 1 has a position control section 10, a velocity control section 11 and a current control section 12, and as the elements relating to the present invention, also has a correction amount generating section 15, a correction amount holding section 16, selector switches 17a, 17b operating in an associated manner, and a coefficient section 18.

In the position control section 10, a velocity command is obtained as follows: A position feedback is obtained by integrating means 13 performing integration of velocity feedbacks from a velocity detector such as a pulse encoder provided to a servomotor M; then, a position deviation is obtained by a subtractor 20 subtracting the position feedback from a position command outputted from a host controller such as a numerical controller; and then, by multiplying the position deviation by a position gain Kp as indicated by reference numeral 14, a velocity command is obtained. In the velocity control section 11, a velocity deviation is obtained by a subtractor 21 subtracting a velocity feedback from the velocity command obtained, and a current command (torque command) is obtained by performing a velocity control procedure based on the velocity deviation obtained. In the current control section, a servomotor M is driven by performing current feedback control based on the current command (torque command) obtained, in the same manner as in the prior art.

The control on the servomotor M, consisting of the above-mentioned position, velocity and current feedback controls, is the same as that in the prior servomotor controllers. Further, the control procedures are performed by a processor, in which respect, the present embodiment does not differ from the prior servomotor controllers.

The present embodiment has a correction amount generating section 15 for generating a correction amount for correcting a position command, a position deviation or a velocity command, a correction amount holding section 16 for holding the correction amount generated, selector switches 17a, 17b operating in an associated manner for choosing between a correction amount sent from the correction amount generating section 15 and a correction amount sent from the correction amount holding section 16, and a coefficient section 18 for multiplying the correction amount chosen by the selector switch 17a by a coefficient k, thereby obtaining a correction amount adapted for an object for which correction is performed.

The coefficient section multiplies the correction amount from the correction amount generating section 15 or the correction amount holding section 16, chosen by the selector switch 17a, by a different coefficient k, depending on whether correction is performed by the adder 19 adding a correction amount to a position command, or the adder 21 adding a correction amount to a position deviation, or the adder 22 adding a correction amount to a velocity command. Although in FIG. 1, adders 19, 21 and 22 are provided, it is possible to arrange such that only one of these adders is provided to correct a position command, a position deviation or a velocity command.

The correction amount generating section 15 detects the value of a fluctuation factor for a to-be-controlled object such as a machine, and obtains a correction amount for correcting any of a position command, position deviation and velocity command, based on the value of the fluctuation factor detected. For example, in order to prevent an increase in position error of a movable part driven by the servomotor due to thermal expansion of a transmission mechanism such as a ball screw/nut mechanism, the correction amount generating section obtains a correction amount based on a signal from a sensor such as a temperature sensor for detecting the machine temperature. When the selector switch 17a is in a position choosing the output of the correction amount generating section 15, the correction amount holding section 16 updates the stored correction amount by storing a correction amount generated by the correction amount generating section 15 and sent via the selector switch 17b, successively. When the selector switch 17a chooses the correction amount holding section 16, the selector switch 17b is opened, so that the correction amount holding section 16 stops the updating of the correction amount and holds the correction amount at the time the connection of the selector switches 17a, 17b was changed.

In the machine tool, the item to which emphasis should be given varies depending on the operating state, such that an increase in the accuracy of positioning an object driven by a servomotor, such as a workpiece or a tool, should be intended, or an improvement in the quality of a machined surface should be intended. For example, when positioning an object with high accuracy by taking account of thermal expansion of a machine component such as a feed axis of a ball screw/nut mechanism is intended, the highly accurate positioning taking account of thermal extension of the machine can be achieved by detecting the machine temperature, obtaining a correction amount for a position command or position deviation based on the temperature detected, and performing correction to the position command or position deviation.

Meanwhile, during the machining of a workpiece, the correction amount varies with fluctuation of the detected temperature, so that the position command or position deviation corrected using the varying correction amount also varies, which causes lowering of the accuracy of a machined surface. In this case, if correction is not performed, the position command or position deviation does not suffer a variation due to correction, so that the quality of a machined surface can be maintained.

Further, in the case where an acceleration of an object is detected to correct a position command, a position deviation or a velocity command based on the acceleration detected, if, at the time of positioning, correction is performed based on the detected acceleration, production of oscillation can be suppressed and positioning can be achieved quickly. Meanwhile, during machining, if correction is performed using a correction amount obtained based on a detected acceleration, the quality of a machined surface lowers. Also in this case, it is preferable to switch between performing and non-performing of correction, depending on the operating state of the machine.

Thus, the present embodiment is arranged to switch between performing correction using a varying correction amount obtained by the correction amount generating section 15 and performing correction using a fixed correction amount stored in the correction amount holding section 16, depending on the machine's operating state, based on an external signal 2. It can be arranged to simply switch between performing and non-performing of correction, depending on the machine's operating state, namely depending on whether emphasis should be given to positioning or the like or the quality of a machined surface. The present embodiment, however, further intends to reduce a change in correction amount at the time of a switch, to prevent the machine from suffering a shock at the time of a switch between performing and non-performing of correction.

In the case where a switch between performing and non-performing of correction is made, the position command or position deviation can vary to a great degree when correction is started or stopped, which can cause a rapid movement of the servomotor M and give a shock to the machine. Thus, in the present embodiment, depending on the machine's operating state, based on the external signal 2, the connection of the selector switches 17a and 17b is changed to choose the output of the correction amount generating section 15 or the output of the correction amount holding section 16, as a correction amount. Incidentally, when it is arranged to simply switch between performing and non-performing of correction, the correction amount holding section 16 in FIG. 1 does not need to be provided.

Figure 2:
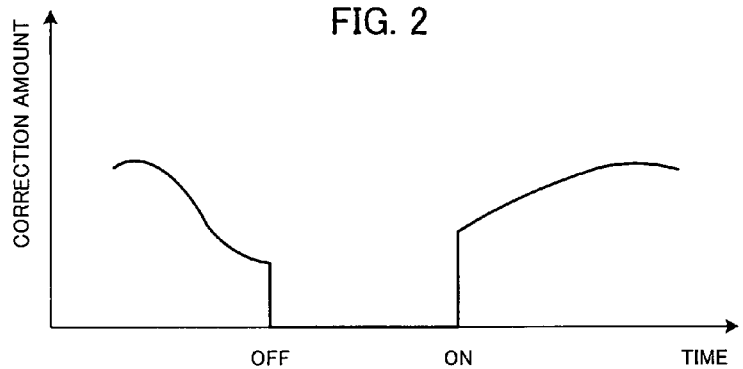
FIG. 2 is a diagram showing how the correction amount changes when a switch between performing and non-performing of correction is made.
Figure 3:
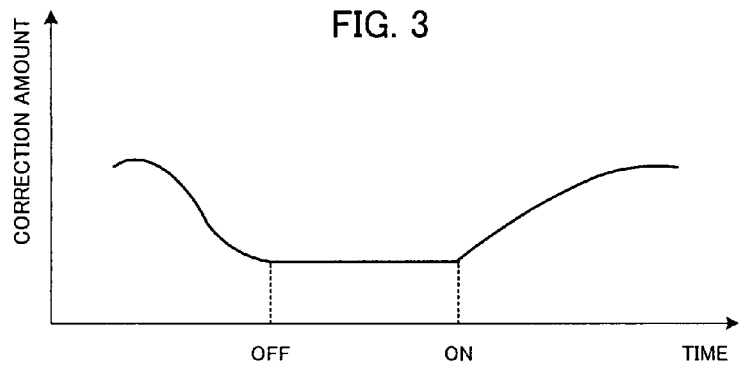
FIG. 3 is a diagram showing how the correction amount changes when a switch between correction modes is made in the first embodiment of the present invention.

FIGS. 2 and 3 each show an example of how the correction amount changes when a switch between correction modes is made based on the external signal 2. Specifically, FIG. 2 shows an example in which a switch between performing correction using a correction amount generated by the correction amount generating section 15 and performing no correction is made. FIG. 3 shows an example in which a switch between a correction amount sent from the correction amount generating section 15 and a correction amount sent from the correction amount holding section 16 is made, as shown in FIG. 1.

As FIG. 2 shows, in the case where a switch between performing and non-performing of correction is made, if the correction amount is great immediately before a switch to non-performing of correction is made, the position command or the like changes to a great degree. Further, if, at the time a switch to performing of correction is made to resume correction using a correction amount generated by the correction amount generating section 15, the correction amount generated by the correction amount generating section 15 is great, the correction amount is changed from "0" to the great value, so that the position command or the like changes to a great degree, which can give a shock to the machine. Meanwhile, if the correction amount generated by the correction amount generating section 15 is small at the time a switch between performing and non-performing of correction is made, a shock given to the machine is small. Thus, in a machine in which the correction amount does not take a great value (in FIG. 2, a change in correction amount at the time of a switch is small), control can be performed by making a switch between performing and non-performing of correction without providing a correction amount holding section 16.

Meanwhile, when a switch is made between correction using a correction amount from the correction amount generating section 15 and correction using a correction amount from the correction amount holding section 16 as shown in FIG. 1, the correction amount does not change to a great degree at the time of a switch as shown in FIG. 3, so that the machine does not suffer a shock. When the external signal 2 comes into an OFF state so that a switch to correction using a correction amount from the correction amount holding section 16 is made, the correction amount holding section 16 holds a correction amount immediately before the external signal 2 came into the OFF state. Thus, the correction amount does not change at the time of the switch, and correction is performed using the fixed correction amount held in the correction amount holding section 16. Also when the external signal 2 comes into the ON state so that a switch to correction using a correction amount generated by the correction amount generating section 15 is made, the correction amount does not change rapidly, since the correction amount generating section 15 generates a correction amount using a filter, as described below.

Figure 4A:
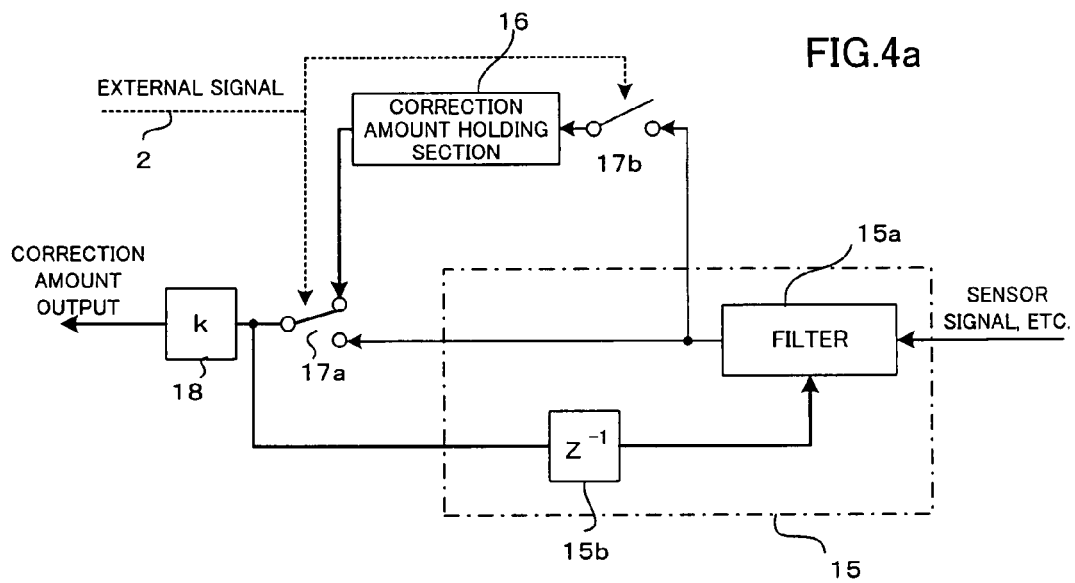
FIGS. 4a and 4b show the details of a correction amount generating section and how a switch between correction quantities is made in embodiments of the present invention.
Figure 4B:
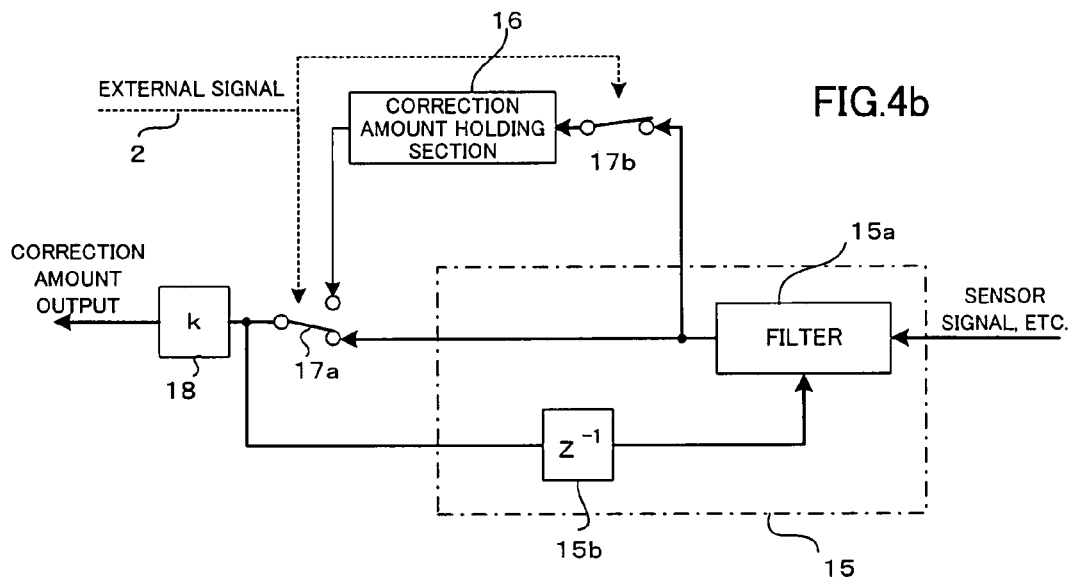

FIGS. 4a and 4b show the details of the correction amount generating section 15 and of a switch between correction quantities based on the external signal 2. The correction amount generating section 15 comprises a digital filter 15a and a lag element 15b. As FIG. 4a shows, when the external signal 2 is in the OFF state, the selector switch 17a chooses a correction amount stored in the correction amount holding section 16, and the selector switch 17b blocks the entry of a correction amount to the correction amount holding section 16.

Meanwhile, as FIG. 4b shows, when the external signal 2 comes into the ON state, the connection of the selector switch 17a is changed to choose the output of the correction amount generating section 15, and the connection of the selector switch 17b is changed to allow a correction amount generated by the correction amount generating section 15 to enter the correction amount holding section 16.

In the correction amount generating section 15, when the external signal 2 comes into the ON state, a correction amount is obtained by the filter 15a processing a signal from the sensor, using a correction amount in the last cycle, which is stored in the lag element 15b, as an initial value. By this, a change in correction amount at the time of the switch is kept small. As shown in FIG. 4b, the output of the filter is sent via the selector switch 17a to the coefficient section, where it is multiplied by a coefficient k, which is set according to an object for which correction is performed, to generate and output a final correction amount. The output of the correction amount generating section 15 (output of the filter 15a) is also sent via the selector switch 17b to the correction amount holding section 16.

Each time a new correction amount enters, the correction amount holding section 16 updates the stored correction amount by storing the new correction amount in place of the previous one. As FIG. 4a shows, when the external signal 2 comes into the OFF state, the connection of the selector switches 17a, 17b, which are arranged to operate in an associated manner, is changed so that a correction amount stored in the correction amount holding section 16 is sent out.

The external signal 2 can be a signal outputted from a host controller such as a numerical controller according to a machining program or the like, a signal manually entered, or a signal outputted from a sequencer or the like.

Figure 5:
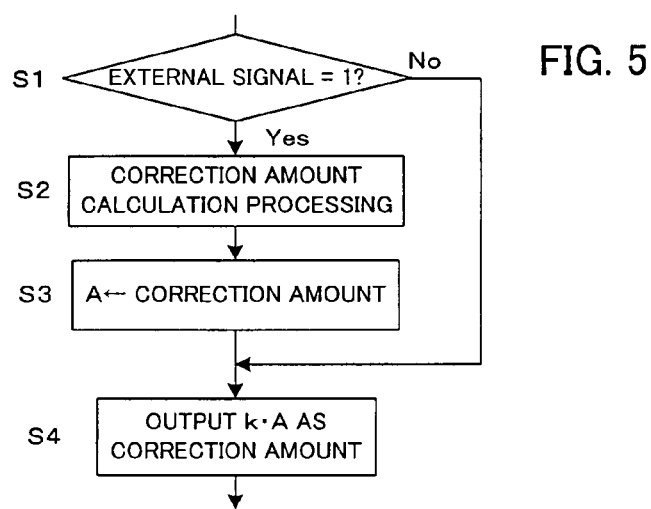
FIG. 5 is a flow chart showing an algorithm for outputting a correction amount in the embodiments of the present invention.

FIG. 5 shows a procedure for outputting a correction amount, which a processor of this servomotor controller 1 performs in parallel with a position and velocity feedback procedure.

First, whether the external signal is 1 (ON) or not is determined (Step S1). If the external signal is not ON, a correction amount stored in a register A multiplied by a coefficient k is outputted as a correction amount adapted for an object for which correction is performed (Step S4), with which the correction-amount outputting procedure ends. Based on the correction amount thus outputted, a position command, a position deviation or a velocity command is corrected as described above, and the position and velocity output procedure is performed.

If the external signal is 1 (ON), a correction amount is calculated by performing a correction-amount calculation procedure based on a signal from the sensor, using a correction amount stored in the register A as an initial value (Step S2). The correction amount obtained is stored in the register A (Step S3), and then in Step 4, the correction amount stored in the register A multiplied by the coefficient k is sent out as a final correction amount, with which the current cycle of the correction-amount outputting procedure ends.

As the flowchart of FIG. 5 shows, when the external signal is "1", the correction amount stored in the register A is updated, and when the external signal is not "1", the correction amount stored in the register A is not updated but held as it is.

For the case in which correction is not performed when the external signal is OFF as shown in FIG. 2, the procedure of FIG.5 only needs to be modified in the following respects: When the external signal is not "1", "0" is put into the register A, while the other things remain unchanged; Further, when the external signal is not "1", the correction-amount outputting procedure ends without sending out a correction amount. When the external signal is "1", a correction amount is obtained in Step S2 by performing the correction-amount calculation processing based on a signal from the sensor, not using a correction amount stored in the register A as an initial value; The correction amount thus obtained is stored in the register A, and the value stored in the register A multiplied by the coefficient k is sent out as a final correction amount.

Figure 6:
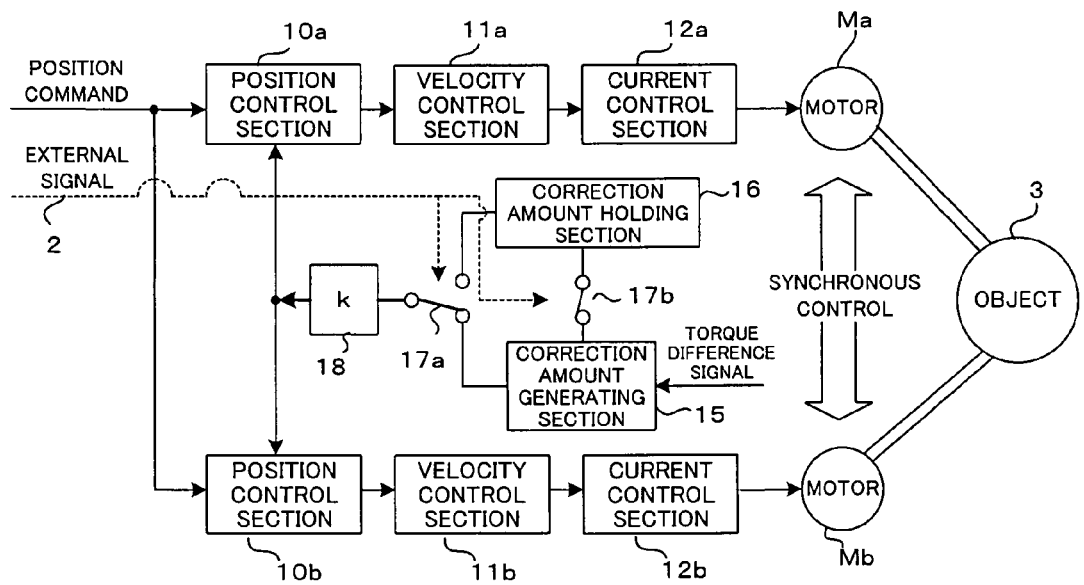
FIG. 6 is a schematic block diagram showing a second embodiment of the present invention.

FIG. 6 is a schematic block diagram showing a second embodiment of the present invention.

The second embodiment is an embodiment of a controller designed to perform a tandem control in which one object 3 is driven by two servomotors Ma, Mb subjected to synchronous control.

It is arranged such that an object 3 is driven by two servomotors Ma, Mb. As means for drive-controlling the servomotors Ma, Mb individually, position control sections 10a, 10b, velocity control sections 11a, 11b and current control sections 12a, 12b are provided. The position control sections 10a, 10b each send out a velocity command through position feedback control as shown in FIG. 1, based on a motion command outputted from a host controller such as a numerical controller and a position feedback from a position detector provided to each of the servomotors Ma, Mb or a position detector provided for detecting the position of the object 3. It is to be noted that from the host controller, the same position command is outputted to the control sections 10a and 10b.

The velocity control sections 11a, 11b each obtain a current command (torque command), through velocity feedback control, based on a velocity command for each and a velocity feedback from a velocity detector provided to each of the servomotors Ma, Mb. The current control sections 12a, 12b drive the servomotors Ma, Mb, respectively, to move the object 3, through current feedback control, based on a current command (torque command) for each and a current feedback from a current detector provided for detecting a drive current for each of the servomotors Ma, Mb.

Like the first embodiment, the present embodiment further has a correction amount generating section 15, a correction amount holding section 16, selector switches 17a, 17b, and a coefficient section 18. To each of the servomotors Ma, Mb, a torque monitoring means is provided. A correction amount is obtained from a difference between output torques of the servomotors monitored by the torque monitoring means, and a position command, position deviation or velocity command for control sections for controlling the servomotors Ma, Mb is corrected, as in the first embodiment. In this respect, the present embodiment is similar to the first embodiment. Specifically, when the external signal 2 is ON ("1") so that the selector switch 17a is connected to the correction amount generating section 15, the correction amount generating section 15 obtains a correction amount based on a difference between output torques of the servomotors Ma, Mb monitored by the torque monitoring means. The coefficient section 18 multiplies this correction amount by a set coefficient k, and using the resulting value, a position command, position deviation or velocity command is corrected. The correction amount generated by the correction amount generating section 15 is stored in the correction amount holding section 16.

When the external signal 2 is OFF ("0"), the selector switch 17a is connected to the correction amount holding section 16, so that the coefficient section 18 multiplies a correction amount stored in the correction amount holding section 16 by the coefficient k, and using the resulting value, a position command, position deviation or velocity command is corrected. The selector switch 17b is opened so that the correction amount stored in the correction amount holding section 16 is not updated.

This correction control is the same as that in the first embodiment, and the correction-amount outputting procedure in the present embodiment is the same as the procedure in the first embodiment shown in FIG. 5.

The control sections for controlling the servomotors Ma, Mb perform position feed back control and velocity feedback control based on the position command, position deviation or velocity command thus corrected.

The output torques of the servmotors Ma, Mb monitored by the torque monitoring means can be detected by providing torque detection means to the individual servomotors Ma, Mb. Alternatively, the output torques may be obtained in the form of actual current values (actual drive currents detected by current detectors) used in current feedback control by the current control sections 12a, 12b, or in the form of current commands (torque commands) which are the outputs of the velocity control sections 11a, 11b. Based on a difference between the detected torques (actually detected torques, drive currents, current commands), the correction amount generating section 15 generates a correction amount.

Figure 7:
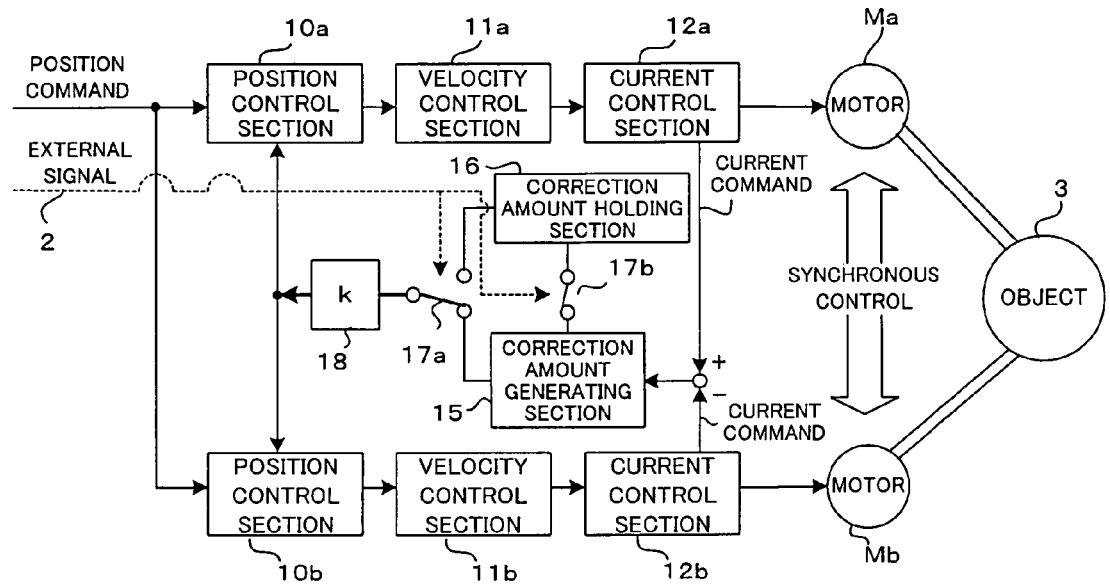
FIG. 7 is a schematic block diagram showing how a correction amount is obtained based on a difference between current commands, in the second embodiment.

FIG. 7 shows an example in which a correction amount is obtained based on a difference between current commands (torque commands) generated by the velocity control sections 11a and 11b.

In the tandem control in which one object is driven by a plurality of servomotors subjected to synchronous control, to which the second embodiment shown in FIGS. 6 and 7 relates, due to thermal expansion of the machine or the like, the positions in motion of the servomotors comes slightly out of agreement, so that motors pull each other, so that stress is produced in each motor. By monitoring the torques of the two servomotors Ma, Mb, and correcting a position command, position deviation or velocity command using a correction amount obtained based on a difference between the torques as in the second embodiment, the stress produced in the servomotors Ma, Mb can be reduced, or in other words, the load exerted on the servomotors Ma, Mb can be reduced.

If such position correction or the like is performed all the time, the position command or the like varies all the time, so that the motion path varies, which causes lowering of the surface quality of a machined piece. Thus, in the second embodiment, based on the external signal 2, a switch is made between correction using a correction amount generated by the correction amount generating section 15, namely, correction using a varying correction amount, and correction using a fixed correction amount held in the correction amount holding section 16. Specifically, when the accuracy of the motion path is required for high machining quality or the like, the correction amount is held constant, and when the accuracy of the motion path for high machining quality or the like is not required in particular (for example, the object is moved for positioning), correction is performed using a varying correction amount generated by the correction amount generating section 15 to prevent an increase in force exerted on the servomotors Ma, Mb.

In the case where a shock given to the machine at the time of a switch between performing and non-performing of correction based on the external signal is negligibly small, also the second embodiment can be modified such that no correction amount holding section 16 is provided, and that when the external signal is OFF, the correction amount is set to "0" not to perform correction.

What is claimed is:

1. A controller for controlling a servomotor for driving a controlled object using a position command, a position deviation and a velocity command, comprising:
    detecting means for detecting a magnitude of a fluctuation factor of the controlled object;
    correction means for determining a correction amount for correcting one of the position command, the position deviation and the velocity command based on the magnitude of the fluctuation factor detected by said detecting means during the control of the servomotor, and performing the correction by the correction amount; and
    switching means for selectively switching performing/non-performing of the correction by said correction means according to an external signal,
    wherein the controller is adapted to control a plurality of servomotors in synchronism, said correcting means includes monitoring means for monitoring respective torques of the servomotors, and determines the correction amount based on a difference between the monitored torques.

2. A controller for controlling a servomotor according to claim 1, wherein the controller is adapted to control two servomotors in synchronism, said monitoring means monitors current commands for the two servomotors, and said correcting means determines the correction amount based on a difference between the monitored current commands.

3. A controller for controlling a servomotor for driving a controlled object using a position command, a position deviation and a velocity command, comprising:
    detecting means for detecting a magnitude of a fluctuation factor of the controlled object;
    correcting means for correcting one of the position command, the position deviation and the velocity command by a correction amount;
    determining means for determining and updating the correction amount based on the magnitude of the fluctuation factor detected by said detecting means during the control of the servomotor; and
    switching means for selectively suspending/resuming the updating of the correction amount by said determining means according to an external signal.

4. A controller for controlling a servomotor according to claim 3, wherein said determining means includes a correction amount holding section for holding a value of the correction amount immediately before the updating of the correction amount is suspended, and said correcting means performs the correction using the value of the correction amount held by the correction amount holding section while the updating of the correction amount is suspended.

5. A controller for a servomotor according to claim 4, wherein said determining means determines the correction amount to be continuously changed using the value of the correction amount held by the correction amount holding section, when the updating of the correction amount is resumed.

6. A controller for a servomotor according to claim 5, wherein said determining means comprises a correction amount generating section including a filter, and the value of the correction amount held by the correction amount holding section is used as an initial output value of the filter so that the correction amount continuously changes when the updating of the correction amount is resumed.

7. A controller for controlling a servomotor according claim 3, wherein the controller is adapted to control a plurality of servomotors in synchronism, said detecting means includes monitoring means for monitoring torques of the servomotors, and said determining means determines the correction amount based on a difference between the monitored torques.

8. A controller for a servomotor according to claim 7, wherein the controller is adapted to control two servomotors in synchronism, said monitoring means monitors current commands for the two servomotors, and said determining means determines the correction amount based on a difference between the monitored current commands.

* * * * *

UNITED STATES PATENT AND TRADEMARK OFFICE
CERTIFICATE OF CORRECTION

| | |
|---|---|
| PATENT NO. | : 7,531,981 B2 |
| APPLICATION NO. | : 11/703797 |
| DATED | : May 12, 2009 |
| INVENTOR(S) | : Yasusuke Iwashita et al. |

It is certified that error appears in the above-identified patent and that said Letters Patent is hereby corrected as shown below:

Column 9, Line 1, change "servmotors" to --servomotors--.

Signed and Sealed this

Eighth Day of September, 2009

David J. Kappos
*Director of the United States Patent and Trademark Office*